United States Patent
Houston et al.

(10) Patent No.: US 6,718,821 B1
(45) Date of Patent: Apr. 13, 2004

(54) LASER INTERFEROMETRY FORCE-FEEDBACK SENSOR FOR AN INTERFACIAL FORCE MICROSCOPE

(75) Inventors: Jack E. Houston, Albuquerque, NM (US); William L. Smith, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 96 days.

(21) Appl. No.: 10/010,095

(22) Filed: Nov. 7, 2001

(51) Int. Cl.[7] .............................. G01N 13/16; G01L 1/08
(52) U.S. Cl. ...................... 73/105; 73/862.61; 356/482; 356/501
(58) Field of Search .............................. 73/105, 862.61; 324/662, 686, 690; 356/450, 501, 477, 482, 900, 901, FOR 107, FOR 120

(56) References Cited

U.S. PATENT DOCUMENTS

| | | | | |
|---|---|---|---|---|
| 4,830,486 A | * | 5/1989 | Goodwin .................. 73/105 X |
| 5,345,815 A | | 9/1994 | Albrecht et al. .............. 73/105 |
| 5,672,816 A | * | 9/1997 | Park et al. ..................... 73/105 |
| 5,705,814 A | | 1/1998 | Young et al. ............... 250/306 |
| 5,825,020 A | | 10/1998 | Hansma et al. ........... 73/105 X |
| 5,852,233 A | * | 12/1998 | Arnold et al. ................. 73/105 |
| 6,178,813 B1 | * | 1/2001 | Bruno et al. ................... 73/105 |
| 6,229,607 B1 | | 5/2001 | Shirai et al. .............. 73/105 X |

OTHER PUBLICATIONS

Joyce and Houston, "A new force sensor incorporating force-feedback control for interfacial force microscopy," Rev. Sci. Instrum. vol. 62 No. 3, Mar. 1991, 710–715.

* cited by examiner

Primary Examiner—Thomas P. Noland
(74) Attorney, Agent, or Firm—Elmer A. Klavetter

(57) ABSTRACT

A scanning force microscope is provided with a force-feedback sensor to increase sensitivity and stability in determining interfacial forces between a probe and a sample. The sensor utilizes an interferometry technique that uses a collimated light beam directed onto a deflecting member, comprising a common plate suspended above capacitor electrodes situated on a substrate forming an interference cavity with a probe on the side of the common plate opposite the side suspended above capacitor electrodes. The probe interacts with the surface of the sample and the intensity of the reflected beam is measured and used to determine the change in displacement of the probe to the sample and to control the probe distance relative to the surface of the sample.

20 Claims, 5 Drawing Sheets

Silicon Detector (X3)

Tertiary Sectioned
IFM Sensor

LASER INTERFEROMETRY FORCE-FEEDBACK SENSOR FOR AN INTERFACIAL FORCE MICROSCOPE

This invention was made with Government support under Contract No. DE-AC04-94AL85000 awarded by the Department of Energy. The Government has certain rights in the invention.

BACKGROUND OF THE INVENTION

The invention relates to scanning probe microscopy and, more particularly, to a multi-axis, force-feedback sensor for use in scanning force-probe microscopy.

Scanning force-probe microscopies, particularly atomic force microscopy (AFM), are widely used as a scanning probe technique in diverse applications ranging from research into fundamental material-science problems through nanoscale fabrication and characterization to advanced metrology at the nanometer scale. However, the atomic force microscope (AFM) uses a deflection sensor to measure sample/probe forces that suffers from an inherent mechanical instability that occurs when the rate of change of the force with respect to the interfacial separation becomes equal to the spring constant of the deflecting member. This instability significantly limits the breadth of applicability of AFM techniques. The instability problem has been addressed by the development of the Interfacial Force Microscope (Joyce, S. A. and Houston, J. E., "A New Force Sensor Incorporating Force-Feedback Control for Interfacial Force Microscopy," 1991, Review of Scientific Instruments 62, 710–715; incorporated by reference herein), which utilizes a self-balancing, force-feedback sensor concept. This concept consists of the use of a deflection sensor incorporating an additional means for imposing a counter force to the deflecting portion of the sensor. The deflection is used to signal the presence of a force and a counter force is applied to bring the deflection back to zero, thus eliminating the instability problem and enhancing the applicability of the scanning force-probe technique. The deflecting member is the common plate of a differential capacitor suspended by torsion bars above two individual capacitor electrodes. The common plate acts as kind of a "teeter totter" rotating about the torsion-bar axis. If a tip is mounted on one end of the common plate and force is applied to it, the teeter totter will rotate about the torsion bar axis causing the capacitor gap on one end to increase while the other will decrease. This difference in capacitance is detected by an ac-bridge circuit that gives a signal that is directly proportional to the tip displacement. When this displacement signal is fed to a controller circuit capable of developing voltages on the capacitor pads to electrostatically oppose the tip-applied force, then the tip displacement can be reduced to arbitrarily small values. By this means, the sensor is stabilized against the mechanical instability discussed above. However, the use of the RF bridge scheme for measuring deflection is cumbersome, requires reasonably sophisticated electronics and scales poorly with the sensor size. The common plate in the present design is made from a 100 $\mu$m thick Si wafer and it, and the torsion bars, are defined by a 25 $\mu$m wide trench etched through the wafer thickness. The common plate is 2.5 mm wide and 5 mm long and the length of the torsion bars is also 2.5 mm. This is very large for a scanning force-probe microscope. The AFM cantilevers are generally about 100 $\mu$m long and only 1 or 2 $\mu$m thick. For ultimate sensitivity, the small size is important. However, detecting small changes in small capacitors is difficult and the capacitance values scale with the square of the pad dimension. Thus, the physical size of the present sensor is a limiting factor and is near its minimum practical value for RF bridge displacement detection. The sensor can only uniquely detect forces along one axis, is difficult and expensive to assemble and is produced with small yields. The high-frequency bridge technique for detecting displacements requires tedious electronics and is limited in sensitivity by the size of the sensor; that is, the sensitivity scales as the area of the capacitor pads and diminishes rapidly with the sensor dimensions.

Young et al. (U.S. Pat. No. , 5,705,814) describe various probes and probe detection systems and their use in microscopes, including atomic force microscopes and scanning tunneling microscopes. Among those described include probes containing piezoelectric materials or other materials which produce changes in electrical properties in response to cantilever bending, such as discussed in Albrecht et al. (U.S. Pat. No. 5,345,815). Albrecht et al. describe a cantilever structure with a piezoresistive resistor embedded in the cantilever arm where deflection of the cantilever produces a change in the resistance. Optical methods can also be used in the probe detection system, such as the system described by Shirai et al. (U.S. Pat. No. 6,229,607), where a ray of light is emitted from a light source and the reflected light is used to detect the flexural deforming in the cantilever of the probe system.

DESCRIPTION OF SPECIFIC EMBODIMENTS

Figure 1:
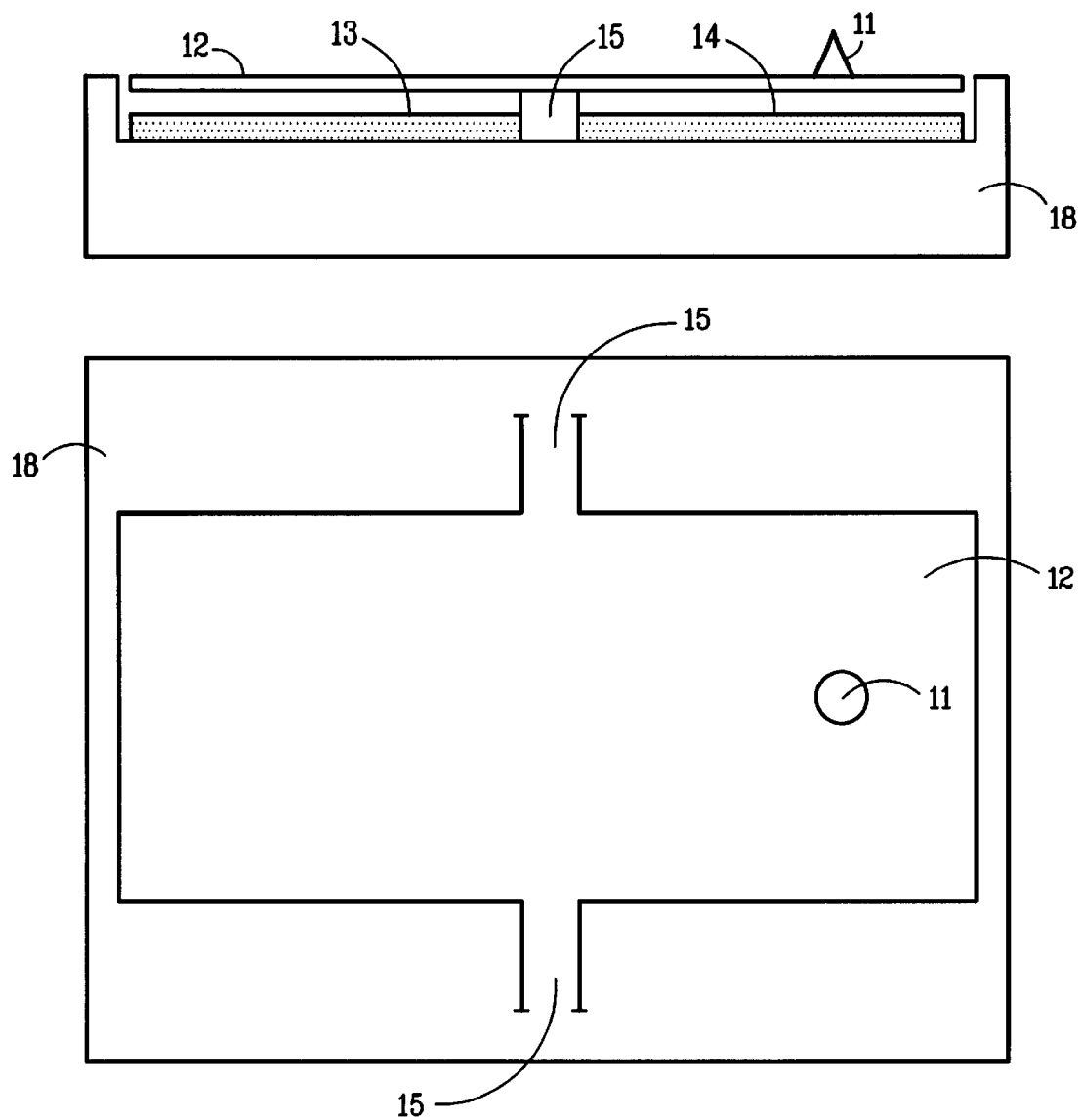
FIG. 1 shows a simplified schematic of the laser-interferometer detection sensor components.

The force-feedback sensor of the present invention stably and independently determines the interfacial force exerted on a small probe during a probe-surface interaction in scanning probe microscopy, thereby improving the sensitivity, stability and efficiency of the microscopy instrument, such as an atomic force microscope. The sensor can function along a single axis or along two or more axes. The force-feedback sensor is incorporated into a microscopy system to determine characteristics of the surface of a provided sample. The sensor uses a deflecting member with a probe tip that interacts with, and is deflected by, the interactions with, the surface of the sample. The deflecting member comprises the common plate of a differential capacitor suspended by torsion bars above two individual capacitor electrodes situated on a substrate, as depicted in FIG. 1. The probe tip 11 is attached to one end of a common plate 12 above two individual capacitor electrodes 13 and 14, attached to a substrate, generally glass, 18. The common plate is suspended by torsion bars 15 and can rotate about the torsion-bar axis. The common plate is made of a reflective metal, such as silicon, or has a reflective metal on its surface. The deflection of the probe tip that occurs upon interaction with the surface of a sample situated opposite the probe tip 11 is determined using a laser interferometric technique.

Figure 2:
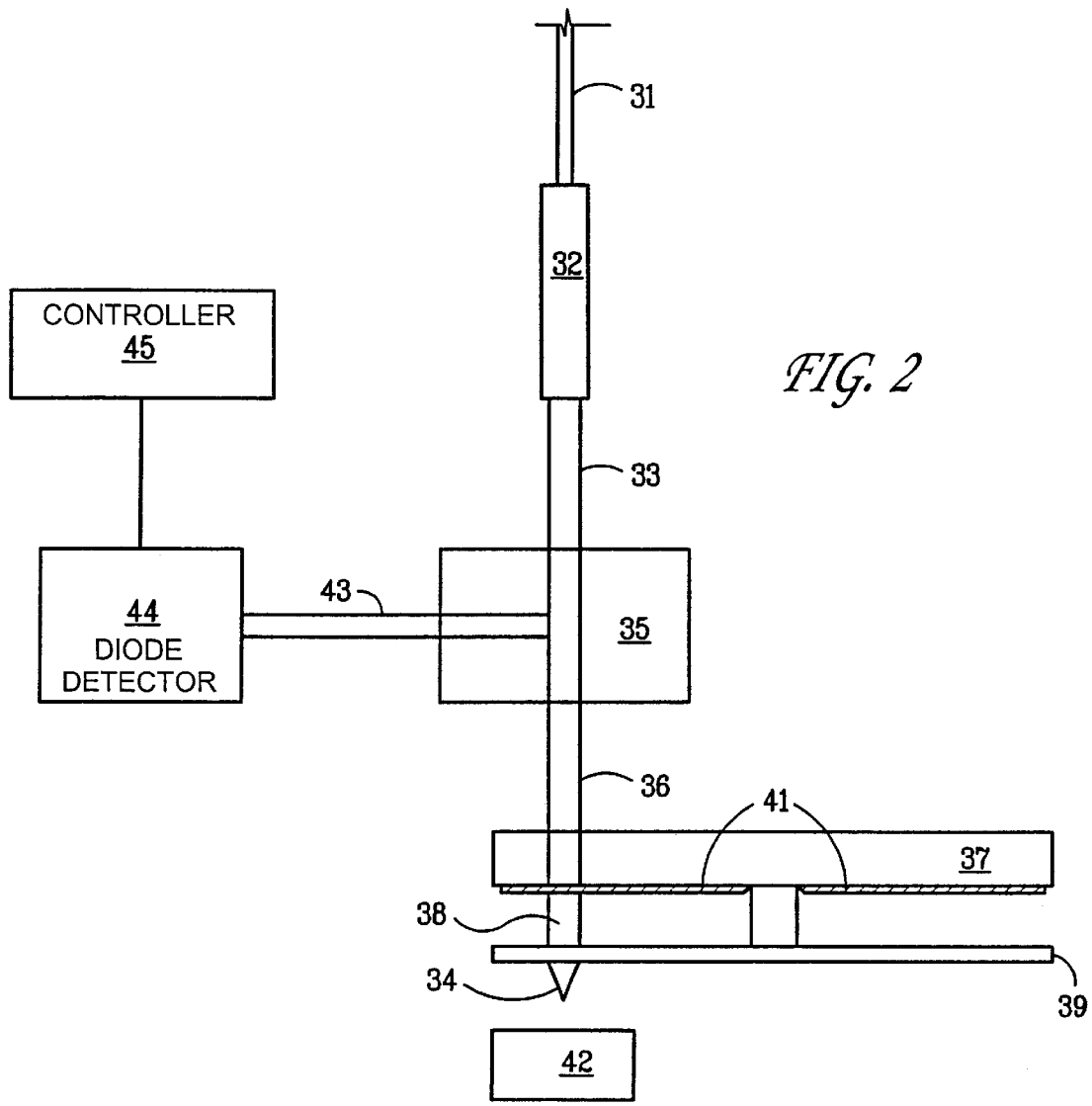
FIG. 2 shows an embodiment of the laser interferometer sensor system.

In the present invention, illustrated in FIG. 2, a light source 31 is passed through a means to collimate the light source, such as through a collimating lens 32. The collimated light source 33 is aligned with the deflecting member of the sensor where the collimated light source, or beam, 33 passes through a beam splitter 35 and the remaining portion of the beam 36 passes through a small aperture in the capacitor electrode on the inner surface of the substrate located in the approximate center of one of the capacitor electrodes 41 and impinges on the area supporting the probe tip 34 from the underside of the common plate 39 supporting the probe tip and reflects back through the substrate 37, interfering with the beam reflecting from the inner surface of the substrate. A gap volume 38 is between the substrate 37 and the common plate 39, as illustrated in FIG. 2. The interaction of the probe tip 34 with the sample 42 affects the capacitor gap 38. After passing back across the gap, the beam interferes with the beam reflected at the aperture, giving rise to an optical signal that depends on the amplitudes of the intensities of the two beams and their relative phase. This resultant back-reflected beam is again split and beam 43 is directed into a diode detector 44 that determines the interference resulting from changes in the capacitor-gap spacing. The data from the diode detector 44 is transmitted to the electronics 45 which determine the change in displacement of the probe relative to the surface of the sample and provide feedback to control the probe tip distance relative to the surface of the sample.

The relative phase of the beams is determined by the wavelength of the light and the gap width according to the relationship, $$\theta = 2\pi 2d/\lambda, \quad (1)$$

where d is the gap width (directly related to the distance of the probe tip to the surface of the sample), λ the wavelength and θ is the angle in radians.

The intensity of the light reflected from the interference cavity is the square of the sum of the amplitudes of the two returning beams, the first reflecting off the front surface of the cavity (amplitude A1 and reference phase=0) and the second reflecting off the back surface (amplitude A2 with phase $2\pi 2d/\lambda$). Thus, the intensity will be, $$I = [A1 + A2 \sin(2\pi 2d/\lambda)]^2 \quad (2)$$

that, if A1=A2, would cycle from zero to $(2A1)^2$ as d is displaced by ¼wavelength, that is, as the sin term in Equation 2 goes from −1 to +1. Thus, the total signal reflected from the sensor will depend on the gap width and will cycle through a maximum when the gap width is changed by one half wavelength. Therefore, by measuring the characteristics of the two returning beams reflected from the interference cavity, the gap width can be determined and the relative displacement of the probe tip to the surface of the sample is determined. The light used is generally in the visible light wavelength range, although other wavelengths could also be used. For a typical laser-diode source, the wavelength is 770 nm so that a complete interference cycle would occur every 385 nm (3850 Å). As a displacement detector, the important parameter is the slope of the back-reflected signal strength at the point of inflection in the interference pattern, i.e., where the signal strength is changing most rapidly. This point occurs when d is at the quarter-wave position and has a slope of $4\pi/\lambda$). Thus, to detect a one Angstrom change in d requires a detection of about one part in 600. In contrast, the presently used RF bridge displacement-detection scheme (with a 5 μm capacitor gap) requires the detection of about one part in 50,000. With current laser technology, considerable signal power can easily be delivered to the sensor and detecting the back-reflected signal only requires a small diode detector and a single operational amplifier, resulting in signal levels in the volt range. This is in contrast to the RF-bridge scheme, which requires a bulky oscillator, a bridge balancing scheme (both amplitude and phase), a high-frequency preamp and RF demodulator. After all this, the RF bridge technique produces signal levels in the sub-millivolt range for similar changes in gap width. This means that in the laser case the electronic noise source is essentially only due to the Johnson noise from a single resistor, whereas the RF-bridge scheme has a multitude of noise sources.

The sensitivity of the RF-bridge scheme depends directly on the size of the capacitors represented by the area of the capacitor pads and the gap between them. The difficulty here is that the capacitance increases with the square of the pad dimension. Therefore, scaling the sensor to smaller sizes becomes ever more difficult with the bridge scheme. The laser system and technique of the present invention has no such limitation. Beam diameters can readily be reduced to the order of 100 μm with no loss in signal strength and no change in the instrumentation. Furthermore, it is straight forward to construct a force sensor that is capable of simultaneously and independently measuring forces in two and three orthogonal directions. At present, no such sensor exists, either with or without force feedback, for independently detecting 2d and 3d forces in the range below the μN level.

The capacitor common plate, generally made from Si, is formed by etching a narrow trench through the common plate suspended above two capacitor pads by torsion springs. The gap between the common plate and pads is etched into a glass substrate and the two are subsequently anodically bonded together. With a center-mounted probe tip (i.e., the probe tip located in the center of the teeter-totter common plate), a force placed on the tip along one axis, the z axis, will cause both capacitor gaps to uniformly increase or decrease, whereas forces along the y axis (i.e., along an axis perpendicular to the torsion-bar axis) will rotate the top plate about the torsion bars increasing one capacitance while decreasing the other. These forces can be balanced by placing the appropriate voltages on the two capacitor pads. When done in a controlled way, the common plate can be maintained in a fixed position, thus eliminating the mechanical instability mentioned above. In order to implement this control, the common-plate position is determined so that it can be held fixed in the force-feedback scheme.

Figure 3A:
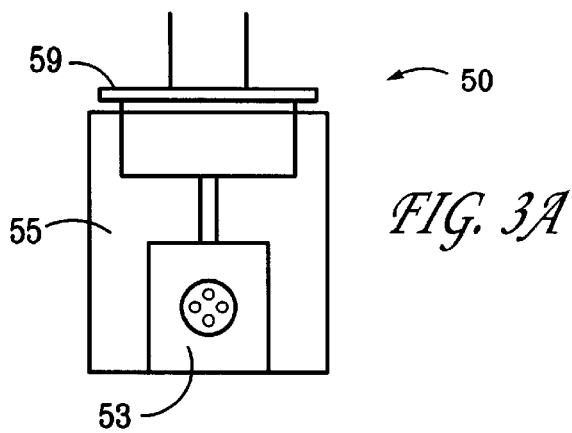
FIG. 3 shows a schematic illustration of the configuration for a single-axis laser-detection sensor system using optical fibers.
Figure 3B:
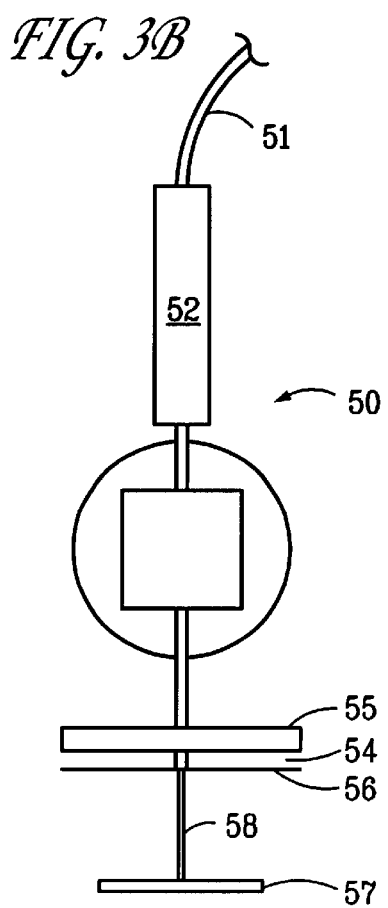
Figure 3C:
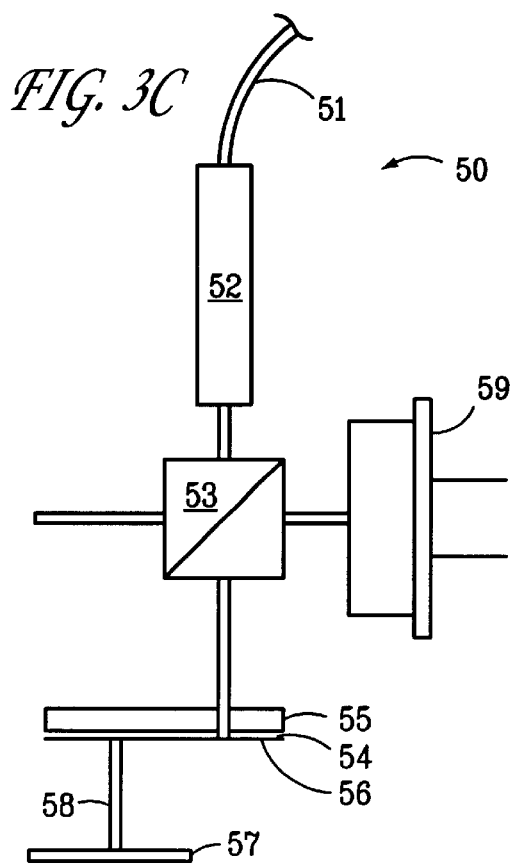

FIG. 3 shows a schematic illustration of the configuration for a single-axis laser-detection sensor system 50. FIG. 3a is similar to FIG. 2, showing the laser beam 51, in this embodiment a fiber-delivered laser beam, being collimated by a collimating lens 52 into an almost perfectly parallel beam. The beam passes through the beam splitter 53 and is split, with one portion of the beam continuing through the splitter and one portion of the beam split off to be optionally used for other purposes. Approximately 50% of the beam passes on through the splitter, interferes in the capacitor-gap interferometer cavity 54 and the portion of the beam resulting from the cavity interference passes back through the splitter. The cavity is formed by the glass substrate 55 on which the capacitor electrodes are located and the Si common plate 56. On the side of the common plate 56 facing the sample 57 is the probe 58, which interacts with the surface of the sample. About 50% of the interference beam returning from the interference within the cavity is then split and impinges on to the broad-area diode detector 59. The detector 59 is connected to electronics (not shown in FIG. 3) that determine the change in displacement of the probe relative to the surface of the sample and provide feedback to control the probe tip distance relative to the surface of the sample.

The scheme illustrated in FIG. 3 for a single-axis laser-detection sensor system readily lends itself to the fully independent detection of two and three orthogonal axes of forces applied to the probe tip. In the sensor of FIG. 2, the common plate of the differential capacitor is supported by torsion bars, which allow both rotational motion about the torsion-bar axis and up-down motion normal to the plane of the plate. If the probe tip is moved to the center of the plate (the "teeter totter", as illustrated in FIG. 4b) and motion of both of its ends can be independently measured, the sensor can be made to detect probe-tip forces both along the long-axis of the "teeter totter" and perpendicular to its plane. Forces normal to the plane cause both capacitor gaps to change in unison and the interferometer will measure signals of the same sign. However, if the force is applied perpendicular to the probe-tip axis (say horizontally to the right in FIG. 2) the gap on the right-hand capacitor 14 will decrease while that on the left-hand pad 13 will increase, causing signals of opposite sign on the two interferometer detectors. Thus, normal forces are proportional to the sum of the signals from the two interferometers while lateral forces are proportional to the difference.

Figure 4A:
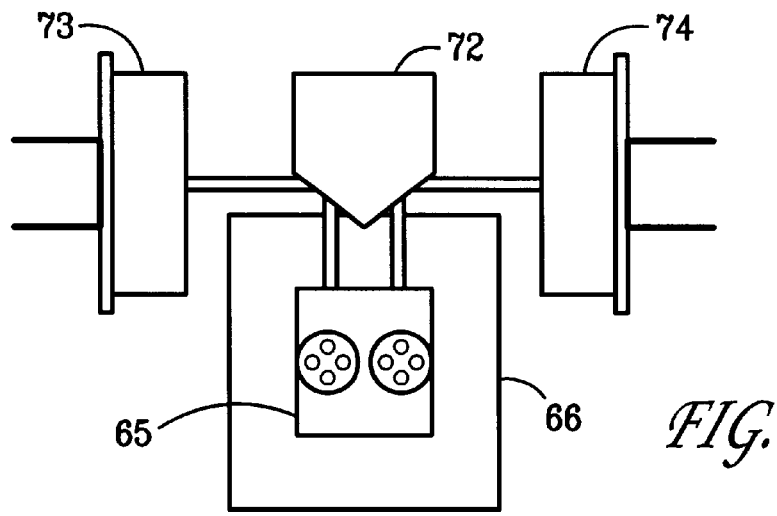
FIG. 4 shows a schematic illustration of the configuration for a two-axis laser-detection sensor system.
Figure 4B:
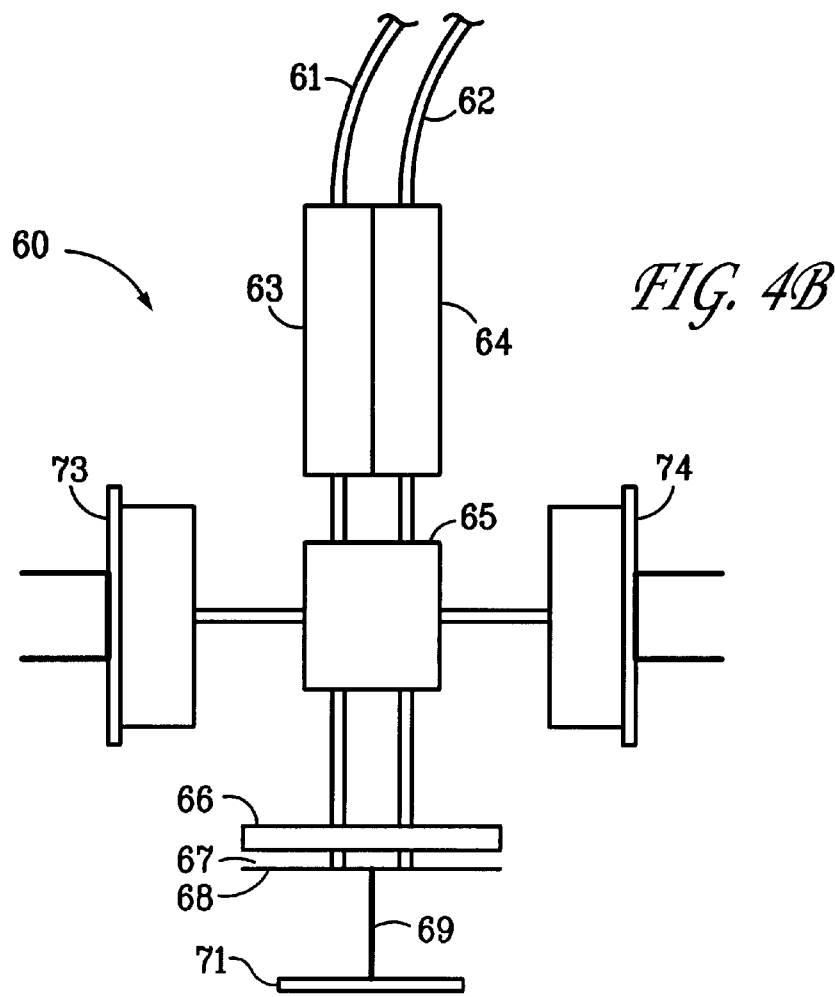

The force-feedback sensor scheme for accomplishing the two-axis detection is illustrated in FIG. 4 and comprises putting in a second identical laser-cavity channel on the other capacitor-pad gap. In the two-axis sensor 60, two optical sources are required, such as the two optical fibers 61 and 62. The fibers are connected to two collimating lenses 63 and 64 to provide the collimated light beams. These two light beams pass through a cubic beam splitter 65 and interfere again in the laser cavity 67 formed by the glass substrate 66 on which the capacitor electrodes are located and the silicon common plate 68. The laser cavity again can change due to interactions between the probe 69 attached to the silicon plate 68 and the sample 71. For the two-axis detection of this embodiment, after the splitting of the returning beams, the beams are reflected in opposite directions by a 900° binary mirror 72. Each beam is then detected by separate diodes 73 and 74 located on opposite sides of the mirror, as shown in FIG. 4a. Again, the alignment, in this somewhat-more complicated arrangement, is made possible by the large detection areas available at the diode detectors. The detectors 72 and 73 are connected to electronics (not shown in the figure) that determine the change in displacement of the probe relative to the surface of the sample and provide feedback to control the probe tip distance relative to the surface of the sample.

Figure 5A:
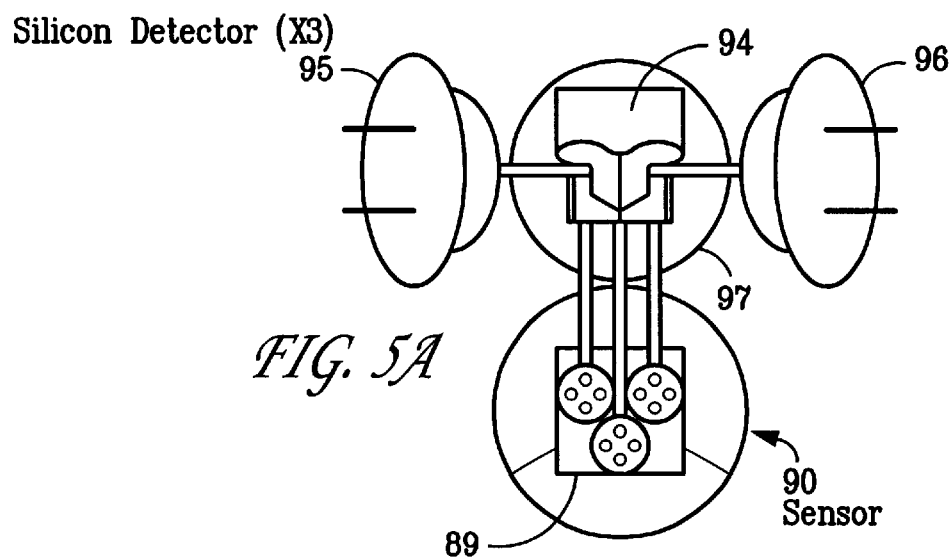
FIG. 5 shows a schematic illustration of the configuration for a three-axis laser-detection sensor system.
Figure 5B:
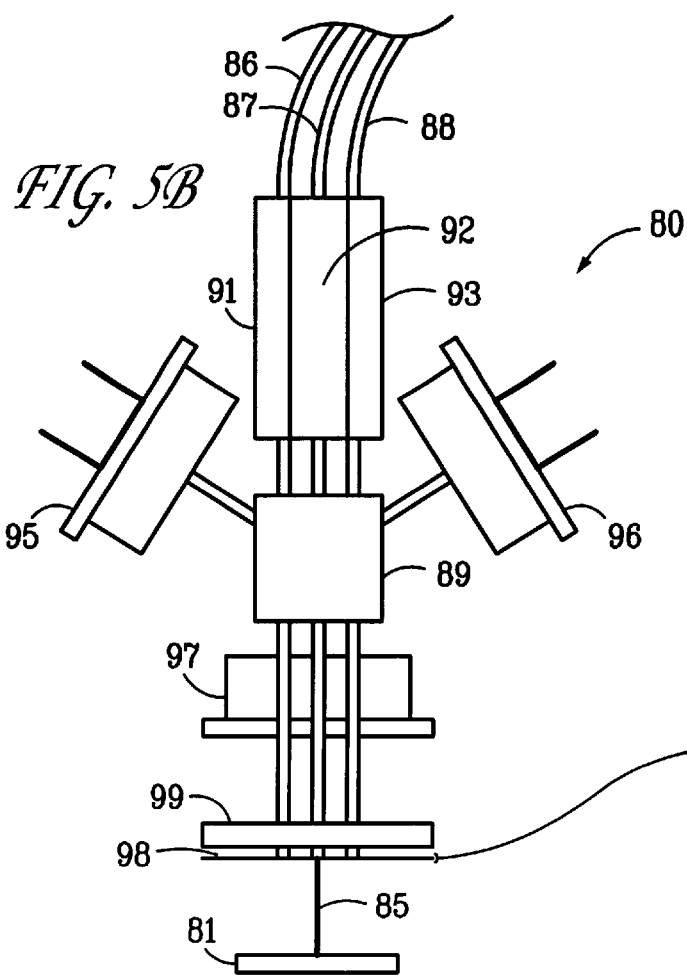
Figure 5C:
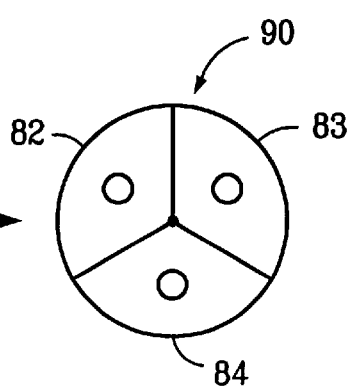

In a similar manner, as illustrated in FIG. 5, a fully independent three-axis sensor 80 can be accomplished, for example, by mounting the probe tip on a common plate that is a thin diaphragm 90, which allows motion along any force axis. The capacitor pads 82, 83 and 84 are laid out in tertiary-sector arrangement on the diaphragm common plate 90, as illustrated in FIG. 5b, with the probe tip 85 located in the center near the surface of the sample 81 to be analyzed. Three collimated laser beams (from optical fibers 86, 87, and 88 that are collimated by collimating lenses 91, 92, and 93) are brought in such a way as to impinge near the center of each sector in order to independently measure each capacitor gap. The interferometer beams reflected from the three sectors pass through the cubic splitter 89 and are reflected at 120° by a 90° tertiary mirror 94, as illustrated in FIGS. 5a and 5b. As in the two-axis configuration, forces normal to the plane of the common plate are detected as the sum of the signals from the three interferometer detectors 95, 96, and 97, while the other two axes involve appropriate sum and difference signals. The laser cavity 98 is again formed by the common plate 90 and the glass substrate 99. The detectors are again connected to electronics (not shown in the figure) that determine the change in displacement of the probe relative to the surface of the sample and provide feedback to control the probe tip relative to the surface of the sample.

It is not necessary to use three fibers and collimating lenses as in the scheme of FIG. 5. The results can be accomplished, in one embodiment, by a single fiber/laser combination where a collimating lens is used which produces a broad, parallel beam that can cover the entire aperture located in the center of the tertiary sector of the common plate 90. The operation is identical to that described in with respect to FIG. 5 except that the detectors measure signals from a somewhat larger area of the individual cavity sectors.

The embodiments of the force-feedback system heretofore described fits into a standard interfacial force microscope head. The head includes the sensor mount and four-quadrant piezo manipulator used for fine positioning and manipulating the probe on the surface. Included in the structure are simple angle and position adjustments for aligning the beam with respect to the aperture in the capacitor pad and a reasonably close alignment of the back reflection at the cavity in order ensure that the back-reflected beams strike the sensitive area of the diode detector(s). The alignment fixture has tolerances which are greatly relaxed compared to the fully enclosed fiber scheme discuss earlier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In a scanning force microscope, the improvement for determining interfacial forces between a probe and a sample, comprising:

means for producing a collimated light beam;

a deflecting member, comprising a common plate suspended above at least two capacitor electrodes situated on a substrate with a probe on the surface of the common plate opposite the surface suspended above the at least two capacitor electrodes, said probe interacting with a surface of the sample, said common plate situated opposite said substrate to produce an interference cavity;

a beam splitter situated between said means for producing a collimated light beam and said deflecting member, said beam splitter directing a portion of the collimated light beam perpendicularly through a back side of the substrate;

a detector for measuring beam intensity; and electronic means for processing algorithms based on beam intensity to determine interfacial forces between said probe and said sample.

2. The scanning force microscope of claim 1 wherein said means for producing a collimated light beam comprises a light source directed through a collimating lens.

3. The scanning force microscope of claim 2 wherein said light source is transmitted using fiber optics.

4. The scanning force microscope of claim 2 wherein said light source produces visible light.

5. The scanning force microscope of claim 1 wherein said light source is a laser-diode.

6. The scanning force microscope of claim 1 wherein said detector is a diode detector.

7. The scanning force microscope of claim 1 wherein said electronic means processes the beam intensity to determine the change in displacement of said probe to said sample and to control the probe distance relative to the surface of the sample.

8. The scanning force microscope of claim 1 wherein said common plate has a surface comprised of a reflecting material.

9. The scanning force microscope of claim 1 wherein said probe is located in the center of said common plate.

10. In a scanning force microscope, the improvement for independently determining interfacial forces between a probe and a sample along multiple axes, comprising:

means for producing at least two collimated light beams;

a deflecting member, comprising a common plate suspended above at least two capacitor electrodes situated on a substrate with a probe on the surface of the common plate opposite the surface suspended above the at least two capacitor electrodes, said probe interacting with a surface of the sample, said common plate situated opposite said substrate to produce two independent interference cavities;

a beam splitter situated between said means for producing at least two collimated light beams and said deflecting member, said beam splitter directing a portion of the at least two collimated light beams perpendicularly through a back side of the substrate;

a mirror situated in the path of the at least two collimated light beams for directing reflected light beams into at least two detectors for measuring the intensity of said reflected light beams; and electronic means for processing algorithms based on beam intensity to independently determine interfacial forces between said probe and said sample along multiple axes.

11. The scanning force microscope of claim 10 wherein said means for producing at least two collimated light beams comprises at least two light sources directed through collimating lenses.

12. The scanning force microscope of claim 11 wherein said light sources are transmitted using fiber optics.

13. The scanning force microscope of claim 11 wherein said light sources produce visible light.

14. The scanning force microscope of claim 11 wherein said light sources produce visible light.

15. The scanning force microscope of claim 10 wherein said light sources are laser-diode light sources.

16. The scanning force microscope of claim 10 wherein said at least two detectors are diode detectors.

17. The scanning force microscope of claim 10 wherein said electronic means processes the beam intensity to determine the change in displacement of said probe to said sample and to control the probe distance relative to the surface of the sample.

18. The scanning force microscope of claim 10 wherein said common plate is a diaphragm common plate.

19. The scanning force microscope of claim 10 wherein said probe is located in the center of said common plate.

20. In a scanning force microscope, the improvement for independently determining interfacial forces between a probe and a sample along three axes, comprising:

means for producing three collimated light beams;

a deflecting member, comprising a common plate suspended above three capacitor electrodes situated on a substrate with a probe on the surface of the common plate opposite the surface suspended above the three capacitor electrodes, said probe interacting with a surface of the sample, said common plate situated opposite said substrate to produce three independent interference cavities;

a beam splitter situated between said means for producing three collimated light beams and said deflecting member, said beam splitter directing a portion of each of the three collimated light beams perpendicularly through a back side of the substrate;

a mirror situated in the path of the three collimated light beams for directing reflected light beams into three detectors for measuring the intensity of said reflected light beams; and electronic means for processing algorithms based on beam intensity to independently determine interfacial forces between said probe and said sample along three axes.

* * * * *